United States Patent [19]

Jones et al.

[11] 4,129,690

[45] * Dec. 12, 1978

[54] SODIUM SULPHUR CELLS

[75] Inventors: Ivor W. Jones; Graham Robinson; Thomas L. Bird, all of Chester, England

[73] Assignee: The Electricity Council, London, England

[*] Notice: The portion of the term of this patent subsequent to Sep. 28, 1993, has been disclaimed.

[21] Appl. No.: 842,013

[22] Filed: Oct. 13, 1977

Related U.S. Application Data

[63] Continuation-in-part of Ser. No. 721,907, Sep. 9, 1976, Pat. No. 4,061,840, which is a continuation-in-part of Ser. No. 550,072, Feb. 14, 1975, Pat. No. 3,982,957.

[30] Foreign Application Priority Data

Feb. 15, 1974 [GB] United Kingdom ............... 4884/75

[51] Int. Cl.² ............................................. H01M 10/39
[52] U.S. Cl. ..................................... 429/104; 429/122; 429/163; 429/193; 429/218
[58] Field of Search .................. 429/104, 101-103, 429/31, 218, 191, 193, 163, 164

[56] References Cited

U.S. PATENT DOCUMENTS

| | | | |
|---|---|---|---|
| 3,883,367 | 5/1975 | Chiku et al. | 429/104 |
| 3,939,007 | 2/1976 | Sudworth et al. | 429/104 X |
| 3,982,957 | 9/1976 | Jones et al. | 429/163 |

*Primary Examiner*—Anthony Skapars
*Attorney, Agent, or Firm*—Beveridge, DeGrandi, Kline & Lunsford

[57] ABSTRACT

In a sodium sulphur cell, the cathode current collector in the sulphur/polysulphide cathodic reactant comprises an impermeable tube, e.g. a carbon or graphite tube which is inert to the cathodic reactant and contains a solid metal core, e.g. an aluminium core, and a deformable electronic conductor, e.g. graphite felt, as a conducting interface between the impermeable tube and the core. In a preferred construction, the current collector is axially located within a cylindrical electrolyte tube, the space between the electrolyte tube and impermeable tube containing the sulphur/polysulphides and a graphite felt. The outer surface of the impermeable tube in this case has grooves or recesses to form a sulphur reservoir.

4 Claims, 1 Drawing Figure

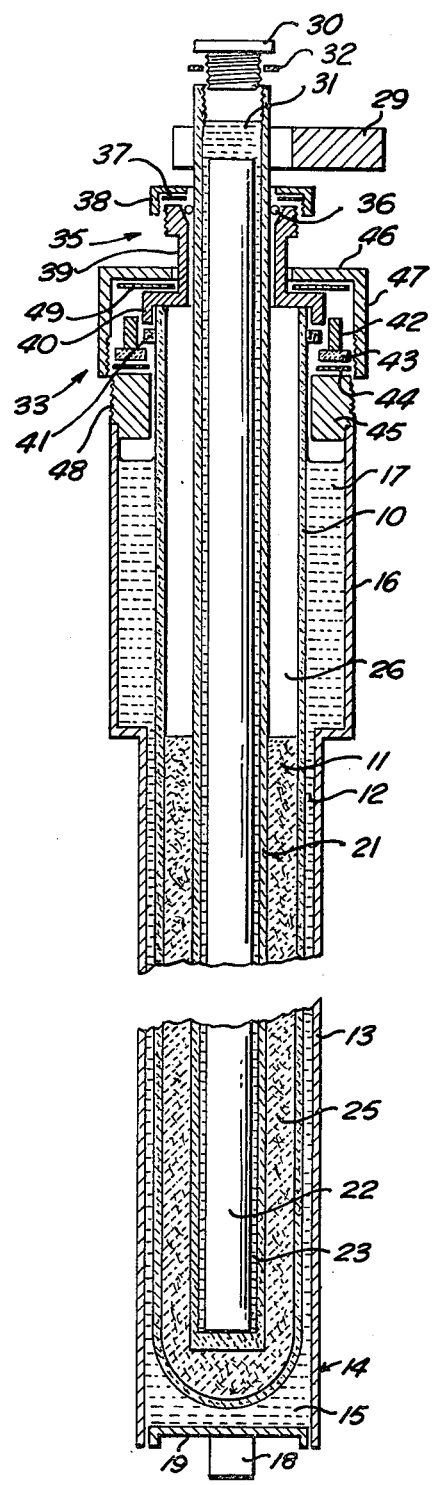

SODIUM SULPHUR CELLS

This application is a continuation-in-part of our co-pending application Ser. No. 721,907 filed Sept. 9, 1976, now U.S. Pat. No. 4,061,840, which application is a continuation-in-part of our application Ser. No. 550,072 filed Feb. 14, 1975, now U.S. Pat. No. 3,982,957. Co-pending application Ser. No. 721,625 filed Sept. 9, 1976 was divided out of application Ser. No. 550,072.

BACKGROUND OF THE INVENTION

1. Field of the Invention

This invention relates to sodium-sulphur cells and is concerned more particularly with the construction of the cathode current collector.

2. Prior Art

Sodium-sulphur cells have a solid electrolyte of beta-alumina separating a liquid sodium metal anode from a liquid cathodic reactant which includes sulphur. This cathodic reactant has a composition which depends on the state of charge or discharge of the cell. As the cell discharges, sodium ions pass through the electrolyte into the cathodic reactant to combine with negatively charged sulphide ions to form sodium polysulphides; the cathodic reactant however is commonly referred to as the sulphur electrode. It is necessary to inject and extract electrons from the sulphur electrode and this is done by means of a porous conductive body, such as a graphite or carbon felt matrix. The porous conductor acts as a large-area electrode surface at which electrons can be supplied to or removed from the sulphur or polysulphides during the cell reaction. As the electrical conductivity of such a porous material is low, a current collector has to be electrically connected to this matrix to enable an external circuit to be connected to the cathode of the cell.

The present invention is concerned more particularly with this cathode current collector. Under the electrochemical conditions prevailing in the sulphur electrode, even stainless steel is subject to corrosion. Heretofore however stainless steel has been considered to be the best material to employ. The corrosion of the steel has several deleterious effects. For example, sulphur which would otherwise be available for reaction in the cell is consumed in the formation of corrosion products. If the cell capacity is controlled by the sulphur, then such consumption of sulphur reduces the cell capacity.

BRIEF SUMMARY OF THE INVENTION

According to one aspect of this invention, in a sodium sulphur cell, there is provided a current collector in contact with the cathode reactant and formed of a tube of electrically conductive impermeable material chemically and electrochemically inert to the cathodic reactant, e.g. an impermeable carbon or graphite tube, an electrically conductive metal core within said tube and a deformable electronically conductive material extending between the core and the internal surface of the tube. The deformable conductor may be a graphite felt or steel wool, the deformable conductor forming a conductive interface between the inner surface of the graphite tube and the metal core.

It will be seen that, by this construction, the only material in contact with the cathodic reactant is the outer tube. This may be made of carbon or graphite or coated with carbon or graphite. Carbon is not significantly attacked by sulphur or sodium polysulphides and this arrangement therefore greatly reduces or eliminates the corrosion problems. The carbon or graphite tube is impermeable and thus the sulphur cannot penetrate it; the tube may conveniently be made impermeable by pyrolytic impregnation.

It will be seen that the cathode current collector described above is of a composite construction. The electrical conductivity of carbon is poor and a simple carbon rod, because of its high resistivity, would impair the cell performance. By providing a conductive member in the graphite tube in the form of a metal rod with a suitable interface between the rod and the tube, the internal surface of the carbon or graphite tube is connected directly to a low resistance electrical path for the cathode current of the cell. The current path through the graphite tube is therefore merely through the thickness of the tube and not along the length of the tube. The problem of the resistivity of carbon is thus overcome giving thereby a form of cathode collector having high conductivity and good corrosion resistance while permitting of easy manufacture.

This technique avoids the problems which arise in attempting to make a cathode current collector for a sodium sulphur cell comprising a solid metal rod with a coating of carbon. During the heating and cooling operations involved in manufacturing, filling and operating a cell, the materials of such a composite may undergo different rates of thermal expansion and the resulting stresses will tend to cause any coating to separate from the substrate metal. The provision of the other deformable interface overcomes these problems. The core may be made of any convenient metal of good electrical conductivity.

Because of the use of a metal core to provide a low conductance path along the length of the current collector, the resistivity of the material of the outer tube is of much less importance; the current merely has to pass radially through the thickness of the outer tube. Thus even relatively poor conductors may be used for the outer tube, e.g. molybdenum or carbide materials such as titanium carbide or chromium carbide. The outer tube however provides the necessary protection against corrosion by the cathodic reactant.

The external electric connection to the current collector may be made by means of a clamp collector around the outer tube or by means of a connection to the core within the tube, for example through an end plug for sealing the outer tube.

The composite electrode must have a sheath which is impervious to penetration by sulphur or polysulphides so that the core is not chemically or electrochemically attacked. A graphite sheath may be rendered impervious by filling the open pores with a resin or metal or any material that is solid at the operating temperature of the cell. The filler material need not be electrically conducting although it may be. However the integrity of such a tube is governed by the relative thermal expansion coefficients of the constituent materials. It is preferred therefore to make the carbon or graphite sheath impervious by filling the pores with a deposit of pyrolytic carbon or graphite. The pyrolytic deposit may be produced by filling the pores with a resin and then heating the tube to carbonise the resin or by heating the tube in a gaseous hydrocarbon atmosphere. Such techniques for making graphite impervious are in themselves well-known and will not be further described.

The cell is conveniently a tubular cell with an electrolyte tube around and concentric with the cathode current collector, the sulphur electrode being in the annular region between the electrolyte and the cathode current collector and the sodium electrode being in an annular region outside the electrolyte and within an outer housing, which housing is typically made of stainless steel and may form the anode current collector. The above-described cathode current collector however may be used in other cell constructions; for example a cell might contain one or more electrolyte tubes with the sodium electrode within the electrolyte tube or tubes, and with the sulphur electrode outside the electrolyte tubes; in this case one or more cathode current collectors as described above may be provided, each comprising a carbon or graphite tube containing a solid metallic core with an interface of deformable material between the core and tube, these cathode current collectors bieng disposed around the or each electrolyte tube.

During discharge of the sodium sulpur cell there is a transfer of sodium ions from the sodium electrode through the solid electrolyte to the sulphur electrode where sodium polysulphides are formed. The volume of material in the sulphur electrode therefore increases during discharge of the cell. When the cell is fully charged it is therefore necessary that the sulphur electrode is only partly filled with sulphur; typically it is about two thirds full. The cell has to have provision for accommodating the increased volume of the cathodic reactant and, in a tubular cell, this may be done by providing a sulphur reservoir at one end of the cell. As previously explained, because of the relatively low electrical conductivity of the sulphur material, it is a known practice in sodium sulphur cells to put a porous conductive body, for example a graphite felt, in the sulphur between the electrolyte and the cathode current collector. To minimise the resistance of the cell however the path length through the sulphur from the electrolyte to the current collector has to be kept small. The porous material also influences the cell operation by controlling the flow of liquid sulphur and sulphides and, as a capillary medium, it can influence the location of these reactants in the electrode. This is particularly important during cell recharge when sodium sulphide must maintain contact with the electrolyte despite an increasing predominance of sulphur content and voidage in the electrode material. The conflicting requirements lead to a compromise. Typically, in a tubular cell, the volume of porous material accommodates only the initial charge of sulphur, leaving the expansion space free. More efficient discharge would be aided by a large felt volume, but better mass flow on recharge would be aided by a small felt volume.

Using the cathode current collector of the present invention having an impermeable carbon graphite tube, the cathode current collector being located inside an electrolyte tube, the external surface of the carbon or graphite tube may be provided with grooves or recesses. Typically these grooves or recesses cover about a third to one half of the surface of the tube. They should have a width such as to allow free access of liquids into and out of the graphite felt provided in a known way between the current collector and the electrolyte surface; the width of the grooves or recesses however is made small enough to ensure that no parts of the electrolyte are too remote from the current collector for effective use. Typically grooves with a width of about 2 mm. are employed. The maximum width is comparable with the felt thickness that is to say the spacing between the electrolyte tube and the current collector. It will be seen that with this arrangement, these grooves provide a space to receive the increased volume of sulphide material on discharge of the cell. However, even when the cell is fully charged, the inner surface of the electrolyte tube is always sufficiently close to an ungrooved portion of the carbon or graphite tube of the current collector to give effective use of the whole surface area or the electrolyte. As the cell discharges, the sulphur material fills the grooves or recesses; by this construction it is thus possible to reduce the size of or eliminate any need for a sulphur reservoir at one end of the cell.

The grooves conveniently are longitudinal if the graphite tube is made by extrusion. With moulded tubes, other patterns, e.g. circumferential or helical or a criss-cross pattern, are readily possible.

The carbon or graphite felt in the sulphur can be attached mechanically or bonded to the carbon or graphite tube of the cathode current collector. Such bonding can be made with pyrolytic carbon or graphite before assembly of the cell; pyrolytic bonding can be carried out by preliminary adhesion with organic resins followed by carbonising treatment or by forming the carbon bond by pyrolysis of gaseous hydrocarbons. Furthermore, the porous felt itself may be incorporated as an uncarbonised precursor which is fired with the carbon or graphite tube of the current collector to form the composite electrode.

BRIEF DESCRIPTION OF THE DRAWING

The accompanying drawing is a longitudinal section through a sodium sulphur cell.

DESCRIPTION OF THE PREFERRED EMBODIMENT

Referring to the drawing there is illustrated a sodium sulphur cell having a solid electrolyte tube 10 formed of beta alumina which electrolyte tube separates a sulphur electrode 11 on the inside of the tube from a sodium electrode 12 on the outside of the tube. The tube 10 is closed at its lower end and, in a typical construction, is 22 cm. long and has an internal diameter of 2.2 cm. The thickness of the tube wall is from 1 to 2 mm. Beta alumina is a ceramic material containing alumina and sodium oxide and possibly small quantities of other materials such as magnesium oxide or lithium oxide. It permits of the passage of sodium ions and hence is used as a solid electrolyte to separate the sulphur and sodium electrodes in a sodium sulphur cell. The tube 10, in the construction shown in FIG. 1, is surrounded by a stainless steel housing 13 which is of cylindrical form. The lower part of the housing, as shown at 14, has an internal diameter about 1 to 3 mm. greater than the external diameter of the tube 10. The narrow annular region between this portion of the housing and the tube 10 contains sodium which is molten during the operation of the cell, the sodium 15 in this region constituting the sodium electrode. Above this narrow annular region, the steel housing has an increased diameter for a length of approximately 5 cm. as shown at 16; this enlarged diameter portion contains sodium and forms a sodium reservoir 17. Electrical connection to the sodium electrode is effected by means of a terminal 18 on an end closure plate 19 closing the lower end of the steel housing 14. The tube 10 is located in the housing 13 by projections on the housing or by wire spot-welded thereto or by putting a porous wick material between the housing and the electrolyte tube.

Within the electrolyte tube 10 is the sulphur electrode and a cathode current collector extending into the sulphur. The current collector comprises a graphite tube 21 which is formed of graphite made impermeable by impregnation with pyrolytic carbon so as to make the tube material impervious to penetration by liquid. The graphite tube 21 is closed at its lower end and has an internal diameter of about 8 to 10 mm. in this particular example. Within the graphite tube is a solid metal rod 22 forming an electrically conductive core. This core may be made of an electrically conductive metal and, in this particular example is aluminium although other electrically conductive materials such as copper or iron might be employed. The metal rod 22 has a diameter about 1 mm. less than the internal diameter of the tube so as to leave a narrow annular space within the tube 21. This space is filled with a deformable electronic conductor 23 which can be any electrically conductive material which does not react with the graphite tube 21 or the metal rod 22. This deformable conductor 23, in accordance with the present invention, is graphite felt.

The conductor 23 effects electrical contact between the internal surface of the graphite tube 21 and the metal rod 22; the rod 22 and conductor 23 form a low resistance electrical path so reducing the electrical resistance to current flow along the length of the cathode current collector.

Between the outer surface of the graphite tube 21 and the inner surface of the electrolyte tube 10 is an annular region containing the sulphur and sulphide materials forming the cathode of the cell. The greater part of this region contains a loose packing or graphite felt 25 or similar material to increase the conductivity of the sulphur/sulphide material forming the electrode. The top part of the annular region between the electrolyte and cathode current collector at 26 is shown in the drawing without any sulphide material. This region forms the sulphur/sulphide reservoir. As the cell is discharged, sodium passes through the electrolyte tube 10 to form sodium polysulphides in the cathode region hence increasing the volume of material forming the cathode. The region 26 serves to accommodate this increased volume of cathodic material as the cell discharges.

Current to and from the cathode passes through the cathode collector constituted by the graphite tube 21 with its core 22 and the conductor 23. An electrical terminal 29 is clamped to the outside of the graphite tube Alternatively a plug 30 forming a top closure for this tube may be electrically connected to the core rod 22 and used as the positive terminal. In the embodiment shown, however, the cathode terminal 29 is clamped to the outside of the graphite tube 21 and the space above the top of the core rod forms a reservoir 31 which allows for thermal expansion of the core when the cell is heated to the operating temperature. The plug 30 is threaded into the top of the graphite tube 21 to form a closure with a gasket 32 to ensure a tight seal.

A seal 35 isolates the sulphur electrode from the external atmosphere where the current collector emerges from the sulphur electrode. This seal comprises an O-ring 36 of elastomeric material and metal packing 37 held in place by a threaded member 38 which engages the threads on an annular element 39 extending across the top of the sulphur region. The element 39 has a downwardly dependent flange 40 extending around the top end of the electrolyte tube 10 and engaging an annular seal 41 which forms a seal between the sodium and sulphur electrodes and between the two electrodes and external atmosphere. The annular seal 41 lies within an annular metal element 42 and is compressed between the bottom of the flange 40 and the upper surface of an insulating washer 43, which washer seats on a flat sealing gasket 44 on the upper surface of an inwardly-directed rim 45 around the top of the housing 13. The insulating washer 43 is required in this embodiment because graphite is used for the packing 41; since graphite is an electrical conductor, the seal has to incorporate an insulator constituted by member 43 as well as the further sealing gasket 44. The seal is held in position by a cap 46 which has a flange 47 engaging an external thread 48 in the rim 45. A mica washer 49 insulates the cap from member 38. It will be noted that the seal is not contacted by the liquid cell reactants or reaction products in this construction so long as the cell is in the upright position illustrated.

We claim:

1. In a sodium sulphur cell having a current collector in contact with the cathodic reactant, the improvement wherein said current collector is formed of a tube of electrically conductive impermeable material chemically and electrochemically inert to the cathodic reactant, a conductive core within said tube and extending along the length thereof, said core being of a solid material having an electrical conductivity greater than that of the tube, and a deformable electronically conductive material extending between the core and the internal surface of the tube to constitute an electrically conductive interface between the core and the inner face of the tube.

2. A sodium sulphur cell comprising a housing, a tubular solid electrolyte within said housing, a sodium electrode sealed in an annular region around said electrolyte tube, a sulphur electrode within said electrolyte tube and a cathode current collector located axially within the tubular electrolyte, the sulphur electrode comprising sulphur/polysulphides in a fibrous matrix located in the annular region beween the cathode current collector and the electrolyte, said current collector comprising a tube of impermeable material chemically and electrochemically inert to said sulphur/polysulphides, a solid metal core in the tube, and a deformable electronic conductor in the annular space between the tube and the core to constitute an electronic current carrying interface between the inner surface of the tube and the core.

3. A sodium-sulphur cell as claimed in claim 2 wherein the deformable electronic conductor comprises graphite felt.

4. A sodium sulphur cell according to claim 2 in which said solid electrolyte is formed of beta alumina.

* * * * *